(12) United States Patent
Kim

(10) Patent No.: US 11,393,470 B2
(45) Date of Patent: Jul. 19, 2022

(54) METHOD AND APPARATUS FOR PROVIDING SPEECH RECOGNITION SERVICE

(71) Applicant: LG ELECTRONICS INC., Seoul (KR)

(72) Inventor: Da Hae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 16/739,811

(22) Filed: Jan. 10, 2020

(65) Prior Publication Data

US 2021/0065704 A1 Mar. 4, 2021

(30) Foreign Application Priority Data

Aug. 29, 2019 (WO) ................ PCT/KR2019/011068

(51) Int. Cl.
| | |
|---|---|
| *G10L 15/22* | (2006.01) |
| *G06N 20/00* | (2019.01) |
| *G06F 40/295* | (2020.01) |
| *G06F 3/16* | (2006.01) |
| *G10L 15/16* | (2006.01) |
| *G10L 15/30* | (2013.01) |

(52) U.S. Cl.
CPC ............. *G10L 15/22* (2013.01); *G06F 3/167* (2013.01); *G06F 40/295* (2020.01); *G06N 20/00* (2019.01); *G10L 15/16* (2013.01); *G10L 15/30* (2013.01); *G10L 2015/223* (2013.01)

(58) Field of Classification Search
CPC .... G10L 15/22–2015/228; G10L 15/16; G10L 15/30; G06N 20/00; G06F 40/295; G06F 3/167

See application file for complete search history.

(56) References Cited

U.S. PATENT DOCUMENTS

| | | | |
|---|---|---|---|
| 2011/0295826 A1* | 12/2011 | McLellan | G06F 16/9535 707/706 |
| 2017/0193999 A1 | 7/2017 | Aleksic | |
| 2018/0367475 A1* | 12/2018 | Galley | H04L 51/02 |
| 2020/0160841 A1* | 5/2020 | Lee | G06N 3/0427 |

FOREIGN PATENT DOCUMENTS

| | | |
|---|---|---|
| KR | 10-2010-0111164 A | 10/2010 |
| KR | 10-2012-0012919 A | 2/2012 |
| KR | 10-1198862 B1 | 11/2012 |
| KR | 10-2016-0044859 A | 4/2016 |
| KR | 10-2018-0087942 A | 8/2018 |
| KR | 10-2019-0059509 A | 5/2019 |

* cited by examiner

*Primary Examiner* — Abul K Azad
(74) *Attorney, Agent, or Firm* — Birch, Stewart, Kolasch & Birch, LLP (57) ABSTRACT

Disclosed are a method for providing a speech recognition service and a speech recognition apparatus, which may perform speech recognition by executing an artificial intelligence (AI) algorithm and/or a machine learning algorithm, which are mounted therein, so that a speech recognition apparatus and a server may communicate with each other in a 5G communication environment. The method and the speech recognition apparatus provide a response based on a user's intention analysis with respect to the ambiguous utterance of the user.

19 Claims, 5 Drawing Sheets

METHOD AND APPARATUS FOR PROVIDING SPEECH RECOGNITION SERVICE

CROSS-REFERENCE TO RELATED APPLICATION

This present application claims benefit of priority to PCT International Application No. PCT/KR2019/011068, entitled "METHOD AND APPARATUS FOR PROVIDING SPEECH RECOGNITION SERVICE," filed on Aug. 29, 2019, the entire disclosure of which is incorporated herein by reference.

BACKGROUND

1. Technical Field

The present disclosure relates to method and apparatus for providing a speech recognition service, and more particularly, to a method of providing a response conforming to a user's intention based on speech recognition, and a speech recognition apparatus for providing a speech recognition service by using the same method.

2. Description of Related Art

A speech recognition technology is being actively applied to personalized speech recognition service in conjunction with the full-scale spread of an artificial intelligence (AI) technology and an Internet of Things (IoT) technology. For example, a user may deliver to a virtual assistant a command of searching for the internet or creating a schedule while communicating with the virtual assistant to which the speech recognition technology has been applied.

The related art 1 (Korean Patent No. 10-1198862B1) relates to a technology of providing a user interface that conforms to a usage pattern of a user authenticated by speech recognition. The related art 1 expresses a user interface corresponding to stored speech information to a terminal when re-recognizing a user speech identical to a stored user speech.

However, the related art 1 does not analyze or execute the command instructed by the user's utterance.

The related art 2 (Korean Patent Laid-Open Publication No. KR1020100111164 A) relates to a speech conversation processing technology of confirming user's utterance intention associated with a vocabulary not included in a vocabulary set. The related art 2 generates conversation history information based on the speech feature information of the input speech, semantic information, and conversation history information, and confirms the intention of the user's utterance.

However, the related art 2 does not disclose a technology of confirming the intention of the user's utterance if the user's utterance is an ambiguous utterance having one or more meanings.

SUMMARY OF THE DISCLOSURE

An object of the present disclosure is to solve the problem of the related art in which a speech recognition error may occur because the user's intention is not confirmed if the user's utterance is ambiguous in a speech recognition service.

Another object of the present disclosure is to provide a reference for selecting a response conforming to a user's intention with respect to the ambiguous utterance of a user in a speech recognition service.

The technical objects to be achieved in the present disclosure are not limited to the above-described technical objects, and other technical objects not described above will be clearly understood by those skilled in the art from the following description.

For achieving the objects, a method for providing a speech recognition service according to an embodiment of the present disclosure may include receiving a speech input of a user, obtaining a plurality of candidate actions extracted from the speech input, deciding relevance between the speech input and each candidate action of the plurality of candidate actions based on current context information of the user, and deciding a final action of the plurality of candidate actions based on the decided relevance.

Specifically, the deciding the relevance may include deciding a weight of each candidate action for each type of each context information by analyzing accumulated context information with respect to the user and calculating the relevance by combining the weights for each candidate action.

A speech recognition apparatus according to an embodiment of the present disclosure may include a microphone configured to receive a speech input of a user, and a processor configured to decide one of a plurality of candidate actions extracted from the speech input as a final action.

Specifically, the processor may be configured to perform an operation of deciding relevance between the speech input and each candidate action of the plurality of candidate actions based on current context information of the user, and an operation of deciding the final action of the plurality of candidate actions based on the relevance.

Here, the operation of deciding the relevance may include an operation of deciding a weight of the each candidate action for each type of each context information by analyzing accumulated context information with respect to the user, and an operation of calculating the relevance by combining the weights for the each candidate action.

In addition, a computer readable recording medium, in which a computer program for executing the method has been stored may be further provided. In addition, another method, another system, and another computer readable recording medium for implementing the present disclosure may be further provided.

Embodiments of present disclosure are not limited to the above-mentioned embodiments, and other embodiments not mentioned above will be clearly understood by those skilled in the art from the following description.

According to the present disclosure, it is possible to select the response to the ambiguous utterance of the user to conform to the user's intention in the speech recognition service, thereby improving the speech recognition performance.

In addition, it is possible to decide the response to the ambiguous utterance according to the current context information of the user, thereby providing the speech recognition service suitable for the user's situation.

In addition, it is possible to decide the response to the user's utterance by analyzing the accumulated context information of the user, thereby providing the speech recognition service optimized to the corresponding user.

The effects of the present disclosure are not limited to those mentioned above, and other effects not mentioned may be clearly understood by those skilled in the art from the following description.

DETAILED DESCRIPTION

Hereinafter, an embodiment disclosed herein will be described in detail with reference to the accompanying drawings, and the same reference numerals are given to the same or similar components and duplicate descriptions thereof will be omitted. Also, in describing an embodiment disclosed in the present document, if it is decided that a detailed description of a related art incorporated herein unnecessarily obscure the gist of the embodiment, the detailed description thereof will be omitted.

The terms used in this application is for the purpose of describing particular embodiments only and is not intended to limit the disclosure. As used herein, the singular forms "a," "an," and "the" may be intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof. Although the terms "ordinal numbers" such as first, second and the like are used to describe various structural elements, the structural elements should not be defined by the terms. These terms are generally only used to distinguish one element from another.

Figure 1:
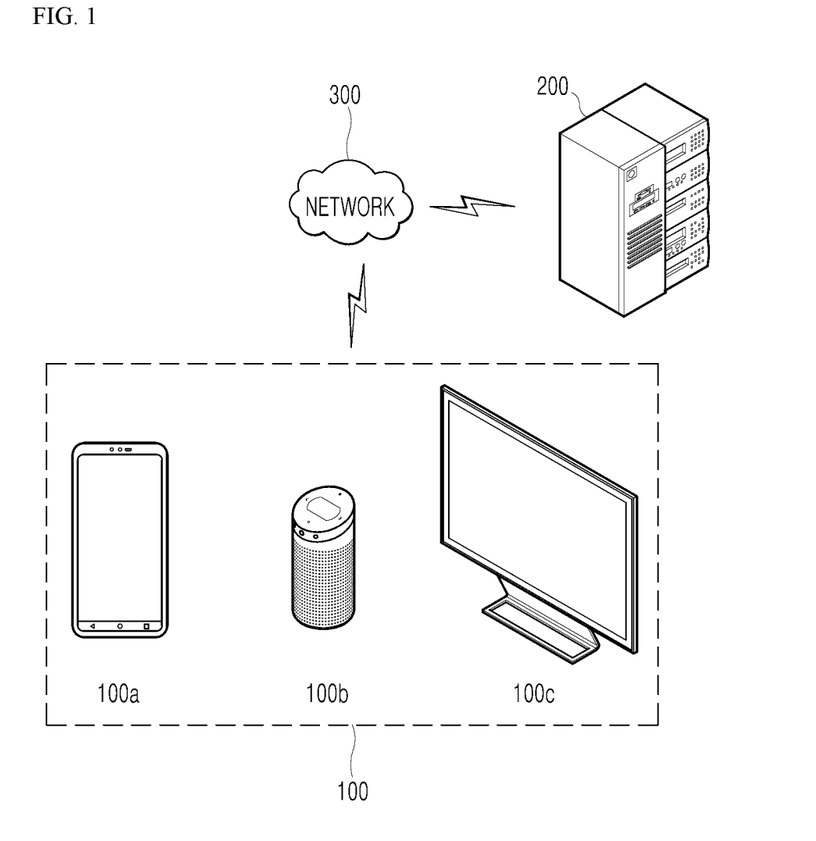
FIG. 1 is an exemplary diagram of a speech recognition environment according to an embodiment.

FIG. 1 is an exemplary diagram of a speech recognition environment according to an embodiment.

A speech recognition environment may include a speech recognition apparatus 100, a server 200, and a network 300. The speech recognition apparatus 100 and the server 200 may be connected to each other in a 5G communication environment. In addition, other than the devices shown in FIG. 1, various other electronic devices for use at a home or an office may be connected to each other and operate in an Internet-of-Things environment.

The speech recognition apparatus 100 may receive a speech uttered by a user, and provide a speech recognition service through recognition and analysis. For example, the speech recognition apparatus 100 may include various electronic devices capable of performing a speech recognition function such as an artificial intelligence (AI) speaker or a communication robot 100b. For example, the speech recognition apparatus 100 may be a desktop computer, a smartphone 100a, a notebook, a tablet PC, a smart TV 100c, a mobile phone, a personal digital assistant (PDA), a laptop, a media player, a micro server, or a global positioning system (GPS) device, an e-book terminal, a digital broadcasting terminal, a navigation device, a kiosk, a MP3 player, a digital camera, a home appliance, and other mobile or non-mobile computing device, which are operated by the user, but is not limited thereto. In addition, the speech recognition apparatus 100 may be a wearable device such as a watch, glasses, a hair band, and a ring having a communication function and a data processing function. For example, the speech recognition apparatus 100 may include various home appliances capable of performing a speech recognition function such as a TV, a washer, and an air conditioner. In addition, the speech recognition apparatus 100 may serve as a hub configured to control an electronic device having no speech input and output function.

The speech recognition apparatus 100 may output a speech recognition processing result by performing the speech recognition function by itself, or by transmitting an input speech to the server 200 and receiving the speech recognition processing result from the server 200.

The server 200 may be a database server that provides big data necessary for applying various artificial intelligence algorithms and data relevant to speech recognition. In addition, the server 200 may include a web server or an application server configured to remotely control the speech recognition apparatus 100.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter decided through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to decide a model parameter for significantly reducing a loss function. The loss function may be used as an indicator for deciding an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The server 200 may perform speech recognition for the speech input, and transmit a speech recognition result to the speech recognition apparatus 100. The server 200 may receive a speech input from the speech recognition apparatus 100, and decide a plurality of candidate actions corresponding to a user's command instructed by the speech input. To this end, the server 200 may use a natural language processing model based on machine learning. The server 200 may transmit information on the decided plurality of candidate actions to the speech recognition apparatus 100.

The network 300 may serve to connect the speech recognition apparatus 100 with the server 200. The network 300 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 300 may also send and receive information using short distance communication and/or long distance communication. Short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 300 may include connection of network elements such as a hub, a bridge, a router, a switch, and a gateway. The network 300 may include one or more connected networks, for example, a multi-network environment, including a public network such as an internet and a private network such as a safe corporate private network. Access to the network 300 may be provided via one or more wired or wireless access networks. Further, the network 300 may support 5G communication and/or an Internet of things (IoT) network for exchanging and processing information between distributed components such as objects.

Figure 2:
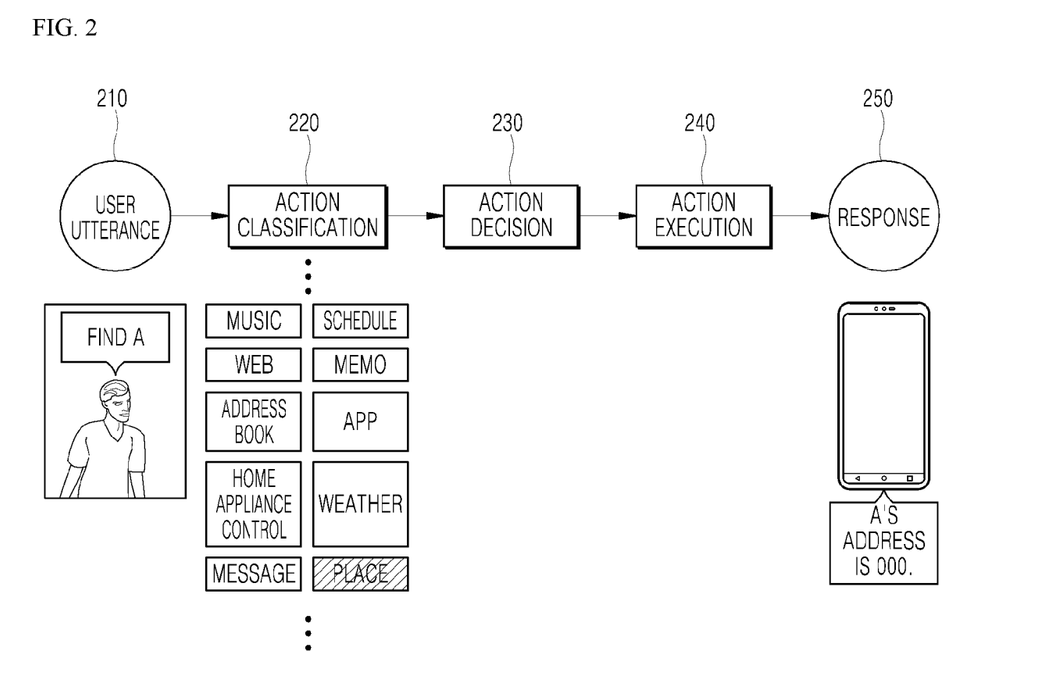
FIG. 2 is a schematic flowchart of a speech recognition service according to an embodiment.

FIG. 2 is a schematic flowchart of a speech recognition service according to an embodiment.

The speech recognition service is a service that recognizes the speech input of the user and provides the user with a result of performing a command instructed by the speech input in response thereto. The speech recognition apparatus 100 is an apparatus for providing the speech recognition service, and obtains a speech input uttered by a user (operation 210), classifies the command instructed by the speech input into at least one action by analyzing the speech input (operation 220), and decides a final action by analyzing the user's intention among the classified actions (operation 230). Subsequently, the speech recognition apparatus 100 executes the final action (operation 240), and based on its result, generates a response and outputs the response to the user (operation 250).

The action is a task executed by the speech recognition apparatus 100 in order to perform the command instructed by the speech input, and the speech input may include a named entity that is the target of the action.

In operation 220, the speech recognition apparatus 100 may derive a command instructed by the speech input by analyzing the speech input. The command instructed by the speech input may include the target of the command and the content of the command. Here, the target of the command corresponds to the named entity and the content of the command corresponds to the action.

In operation 220, the command instructed by one speech input may be classified as an action for a plurality of domains. The domain means a functional category of the action. For example, the command of 'Find A' may be classified as the action for various domains that support a find function. All of music, a schedule, a web, a memo, an address book, an app, a home appliance control, weather, a message, and a place exemplarily shown in FIG. 2 correspond to the domain that supports the find function. The command of 'Find A' may be classified as 'Find A's contact in the address book' (first action) or 'Find a place A' (second action). As described above, the speech input that may be classified into a plurality of actions is called ambiguous utterance.

In operation 230, the speech recognition apparatus 100 may perform user intention analysis in order to decide a final action for the ambiguous speech input that may be classified into the plurality of actions. The user intention analysis in the speech recognition service means classifying a speech input uttered by a user into one of predetermined actions. The user intention analysis contributes to providing a response that conforms to the utterance intention of the user. That is, the speech recognition apparatus 100 selects, as the final action, one action that has been decided as best conforming to the user's intention among the plurality of candidate actions by using the user intention analysis. For example, one action of the first action and the second action, which have been obtained as the result classified in the previous example, is finally selected according to what the domain intended by the user according to the command of 'Find A' is. The method for providing the speech recognition service according to an embodiment will be described in more detail later with reference to FIGS. 4 and 5.

Figure 3:
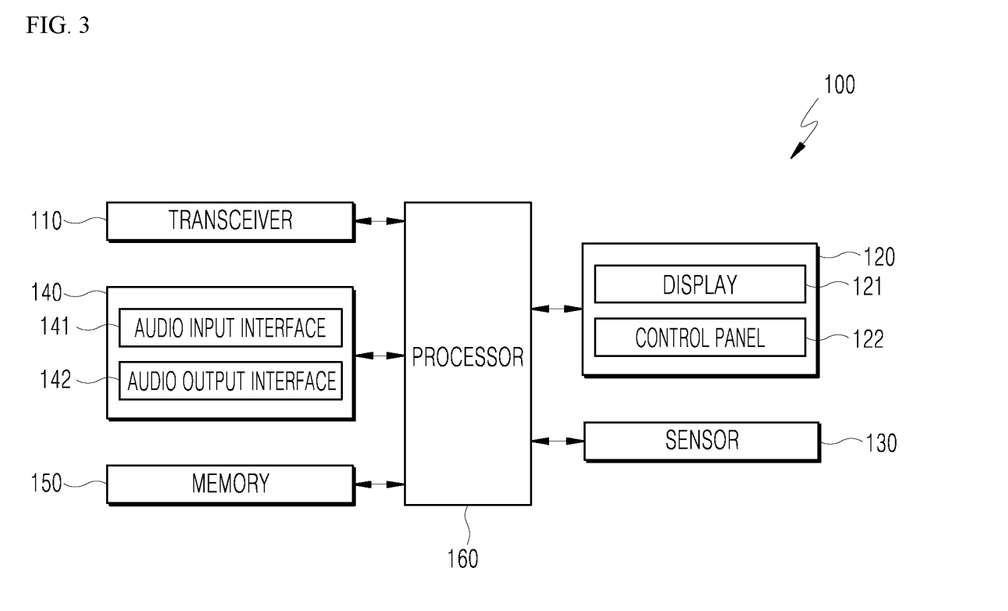
FIG. 3 is a schematic block diagram of a speech recognition apparatus according to an embodiment.

FIG. 3 is a schematic block diagram of a speech recognition apparatus according to an embodiment.

The speech recognition apparatus 100 may include a transceiver 110, a user interface 120 including a display 121 and an control panel 122, a sensor 130, an audio processor 140 including an audio input interface 141 and an audio output interface 142, a memory 150, and a processor 160.

The transceiver 110 may provide a communication interface necessary for providing a transmission and reception signal between the speech recognition apparatus 100 and/or the server 200 in the form of packet data in interlock with the network 300. In addition, the transceiver 110 may be a device including hardware and software necessary for transmitting and receiving a signal such as a control signal or a data signal through a wired or wireless connection with another network device. Furthermore, the transceiver 110 may support a variety of object-to-object intelligent communication, for example, Internet of things (IoT), Internet of everything (IoE), and Internet of small things (IoST), and may support, for example, machine to machine (M2M)

communication, vehicle to everything (V2X) communication, and device to device (D2D) communication.

The transceiver 110 may receive data including a speech input uttered by the user under the control of the processor 160. The processor 160 may perform a method for providing a speech recognition service according to an embodiment by extracting the speech input from data including the speech input received through the transceiver 110.

The transceiver 110 may transmit the speech input to the server 200 under the control of the processor 160, and receive information on a plurality of candidate actions from the server 200 in response thereto.

The display 121 of the user interface 120 may display a driving state of the speech recognition apparatus 100 under the control of the processor 160. In an example, the display 121 may be composed of a touch screen which forms a mutual layer structure with a touch pad. In this case, the display 121 may also be used as the control panel 122 capable of inputting information in response to a touch of a user. To this end, the display 121 may be configured with a touch-sensitive display controller or other various input and output controllers. As an example, the touch recognition display controller may provide an output interface and an input interface between the apparatus and the user. The touch recognition display controller may transmit and receive electrical signals with the processor 160. Also, the touch recognition display controller may display a visual output to the user, and the visual output may include text, graphics, images, video, and a combination thereof. The display 121 may be a predetermined display member such as, for example, a touch-sensitive organic light emitting display (OLED), liquid crystal display (LCD), or light emitting display (LED).

The control panel 122 of the user interface 120 may have a plurality of operation buttons (not shown) to transmit signals corresponding to the buttons to the processor 160. This control panel 122 may be configured with a sensor, button, or switch structure capable of recognizing a touch or pressing operation of the user. The control panel 122 may transmit to the processor 160 an operation signal operated by the user to confirm or change various information relevant to the driving of the speech recognition apparatus 100 displayed on the display 121.

The display 121 may output a speech recognition result of the speech recognition apparatus 100 under the control of the processor 160. Here, the speech recognition result includes a result in which the speech recognition apparatus 100 has executed the action instructed by the speech input of the user.

The sensor 130 may include various sensors configured to sense a surrounding situation of the speech recognition apparatus 100.

The sensor 130 may include a position sensor. The position sensor may obtain position data of the speech recognition apparatus 100. For example, the position sensor includes a Global Positioning System (GPS) sensor and an Inertial Measurement Unit (IMU) sensor. The IMU sensor may include, for example, an acceleration sensor, and/or a gyro sensor, and the like. The position data obtained by the position sensor may be stored in the memory 150.

The sensor 130 may include a proximity sensor. The proximity sensor may obtain position data of an object (for example, a user) positioned near the speech recognition apparatus 100 by using infrared rays, or the like. Meanwhile, the position data of the user obtained by the proximity sensor may be stored in the memory 150.

The sensor 130 may include an image sensor. The image sensor may include a camera (not shown) capable of capturing the surroundings of the speech recognition apparatus 100, and may be installed in plural for the capturing efficiency. For example, the camera may include an image sensor (for example, a CMOS image sensor) configured to include at least one optical lens and a plurality of photodiodes (for example, pixels) imaged by the light having passed through the optical lens, and a digital signal processor (DSP) configured to constitute an image based on the signals output from the photodiodes. The digital signal processor may generate a moving image formed of frames composed of still images as well as the still picture. Meanwhile, the image captured and obtained by the camera as the image sensor may be stored in the memory 150.

The sensor 130 may be a sensor capable of sensing a surrounding situation of the speech recognition apparatus 100, and may include, for example, at least one of a Lidar sensor, a weight sensing sensor, an illumination sensor, a touch sensor, an acceleration sensor, a magnetic sensor, a G-sensor, a gyroscope sensor, a motion sensor, a RGB sensor, an infrared sensor (IR sensor), a fingerprint scan sensor, an ultrasonic sensor, an optical sensors, a microphone, a battery gauge, an environmental sensor (for example, a barometer, a hygrometer, a thermometer, a radiation sensing sensor, a heat sensing sensor, a gas sensing sensor, and the like), or a chemical sensor (for example, an electronic nose, a healthcare sensor, a biometric sensor, and the like). Meanwhile, the speech recognition apparatus 100 may combine and use information sensed by at least two or more sensors of these sensors.

The audio input interface 141 of the audio processor 140 may receive the speech input of the user (for example, a wake-up word and an utterance sentence). To this end, the audio input interface 141 may include at least one microphone (not shown). The audio input interface 141 may obtain the speech input of the user through a microphone and deliver the speech input to the processor 160.

The audio input interface 141 may include a plurality of microphones (not shown) in order to receive the speech input more accurately. Here, each of the plurality of microphones may be disposed at the different positions to be spaced apart from each other, and may process the received speech input with an electrical signal.

In an optional embodiment, the audio input interface 141 may use various noise elimination algorithms for eliminating noise generated while receiving a speech of the user. As an optional embodiment, the audio input interface 141 may include various components for processing speech signals, such as a filter (not shown) configured to eliminate noise when receiving the spoken utterance of the user, an amplifier (not shown) configured to amplify and output a signal output from the filter, and the like.

The audio output interface 142 of the audio processor 140 may output, as an audio, a notification message such as a warning sound, an operation mode, an operation state, or an error state, response information corresponding to the user's utterance, the processing result corresponding to the speech input of the user, and the like according to the control of the processor 160. The audio output interface 142 may convert an electrical signal from the processor 160 into an audio signal to output it. To this end, the audio output interface 142 includes a speaker. The audio output interface 142 may output the speech recognition result of the speech recognition apparatus 100 through the speaker under the control of the processor 160. Here, the speech recognition result includes a result in which the speech recognition apparatus 100 has executed the action intended by the speech input of the user.

The memory 150 stores various information necessary for operating the speech recognition apparatus 100, and may include a volatile or nonvolatile recording medium. For example, the memory 150 may store a predetermined wake-up word for deciding the presence of the wake-up word from the user's utterance. Meanwhile, the wake-up word may be set by a manufacturer. For example, "hi, LG" may be set as a wake-up word, and the setting may be changed by the user. The wake-up word is input to activate the speech recognition apparatus 100, and the speech recognition apparatus 100 that has recognized the wake-up word uttered by the user may switch to a speech recognition activation state.

The memory 150 may store the speech input received through the audio input interface 141 under the control of the processor 160. In addition, the memory 150 may store information sensed by the sensor 130. The memory 150 may store various information processed by the speech recognition apparatus 100 under the control of the processor 160. The various information processed by the speech recognition apparatus 100 may include, for example, command information instructed by the speech input, the named entity and domain information included in the command, candidate action information, final action information, action execution result, and response.

The memory 150 may include magnetic storage media or flash storage media, but is not limited thereto. The memory 150 may include internal memory and/or external memory, and include a volatile memory such as DRAM, SRAM, or SDRAM, a non-volatile memory such as one time programmable ROM (OTPROM), PROM, EPROM, EEPROM, mask ROM, flash ROM, NAND flash memory, or NOR flash memory, a flash drive such as SSD, compact flash (CF) card, SD card, Micro-SD card, Mini-SD card, Xd card, or memory stick, or a storage device such as HDD.

The processor 160 may perform a speech recognition service for the user spoken utterance received through the audio input interface 141 and provide the result as visual information through the display 121, or provide it as auditory information through the audio output interface 142.

The processor 160 is a kind of central processing unit, and may control the operation of the entire speech recognition apparatus 100 by driving the control software mounted in the memory 150. The processor 160 may include all kinds of devices capable of processing data. The processor 160 may mean a data processing device embedded in hardware, for example, having a physically structured circuit for performing a function represented by a code or a command included in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto. The processor 160 may be configured to comprise one or more processors.

The processor 160 may execute an application program that implements the method for providing the speech recognition service according to an embodiment by controlling each component module of the speech recognition apparatus 100.

The processor 160 may receive the speech input of the user by controlling the microphone of the audio input interface 141 or receive the speech input of the user by controlling the transceiver 110.

The processor 160 may perform an operation of deciding one action among a plurality of candidate actions extracted from the speech input of the user as the final action. To this end, the processor 160 may be configured to perform an operation of deciding relevance between the speech input and each candidate action of the plurality of candidate actions based on the current context information of the user and an operation of deciding the final action among the plurality of candidate actions based on the decided relevance.

The operation of deciding the relevance performed by the processor 160 includes an operation of deciding a weight of each candidate action for each type of each context information by analyzing the accumulated context information with respect to the user and an operation of calculating the relevance by combining the weight for each candidate action.

The operation of deciding the weight performed by the processor 160 may include an operation of deciding the frequency of performing the candidate action by analyzing the accumulated context information and an operation of deciding the weight held by each candidate action with respect to the type of each context information based on the decided frequency.

The processor 160 may perform machine learning, such as deep learning, with respect to the speech input so that the speech recognition apparatus 100 outputs an optimal speech recognition result, and the memory 150 may store data used in the machine learning, the result data, and the like. For example, the memory 150 may store a natural language processing model based on machine learning for analyzing speech recognition.

The processor 160 may drive an artificial neural network, and perform machine learning based speech recognition using the received speech input as input data. For example, the processor 160 may extract a plurality of candidate actions from the speech input by recognizing and analyzing the speech input by using a natural language processing model based on machine learning.

Figure 4:
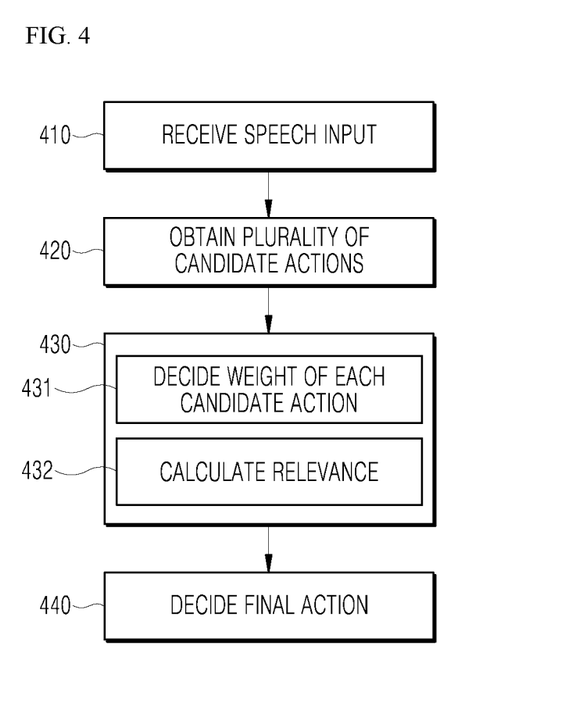
FIG. 4 is a flowchart of a method for providing a speech recognition service according to an embodiment.

FIG. 4 is a flowchart of a method for providing a speech recognition service according to an embodiment.

The speech recognition service is a service that recognizes a speech input of the user and provides the user with a result of performing a command instructed by the speech input in response thereto. The speech recognition apparatus 100 may provide the speech recognition service to the user by executing the method for providing the speech recognition service according to an embodiment.

In operation 410, the speech recognition apparatus 100 receives the speech input of the user. The speech recognition apparatus 100 may directly obtain the speech input of the user through the audio input interface 141 such as a microphone or receive the speech input transmitted by another electronic device through the transceiver 110.

In operation 420, the speech recognition apparatus 100 obtains a plurality of candidate actions extracted from the speech input received in the operation 410. The action may include at least one task that the speech recognition apparatus 100 should execute in order to perform the command instructed by the speech input.

In the operation 420, the speech recognition apparatus 100 obtains a plurality of candidate actions from the speech input obtained in the operation 410. The speech recognition apparatus 100 may decide the plurality of candidate actions instructed by the speech input by recognizing and analyzing the speech input by using the natural language processing model based on machine learning stored in the memory 150.

For example, the speech recognition apparatus 100 may generate text representing speech input by using a speech-to-text technology, and extract the plurality of candidate actions from the generated text by using the natural language processing model. Here, the natural language processing model may include the learning model based on machine learning trained to output candidate actions according to a combination of a named entity and a domain when the speech input or the text representing the speech input is input. Meanwhile, since there is a limitation in the system resource of the speech recognition apparatus 100, complex natural language recognition and processing may be performed through the server 200. For example, the server 200 may receive the speech input or the text representing the speech input from the speech recognition apparatus 100, and extract the plurality of candidate actions by processing the text representing the speech input with a natural language processing. The server 200 may perform a natural language recognition and processing process for the speech input by using the mounted natural language processing model based on machine learning. In this case, the speech recognition apparatus 100 may transmit the speech input or the text representing the speech input to the server 200 through the transceiver 110 and receive information on the plurality of candidate actions decided by the server 200.

In the operation 420, the speech recognition apparatus 100 or the server 200 may extract the named entity embedded in the speech input and decide the domain information by classifying a category of the action instructed by the speech input in order to decide the candidate action. The domain is a category of a predetermined action according to the function of the action. The speech input may be classified into actions for the plurality of domains, that is, the plurality of candidate actions, as described above with reference to FIG. 2.

Each candidate action of the plurality of candidate actions includes the named entity that is the target of the action and the domain information having classified the category of the action. That is, the speech recognition apparatus 100 or the server 200 decides the plurality of candidate actions according to a combination of the named entity and the domain information for the speech input by analyzing the speech input in the operation 420. In an example, the analyzing the speech input may include generating a text representing the speech input and processing the generated text by using a natural language processing model.

Meanwhile, each candidate action decided in the operation 420 may be distinguished from each other by the combination of the named entity and the domain information. For example, if the plurality of candidate actions include a first candidate action and a second candidate action, a first combination of the named entity and the domain information of the first candidate action is different from a second combination of the named entity and domain information of the second candidate action. Here, the fact that the first combination and the second combination are different from each other means any one among a case where the named entities of the first candidate action and the second candidate action are different from each other, a case where the domain information is different from each other, and a case where both the named entity and the domain information are different.

In operation 430, the speech recognition apparatus 100 decides the relevance between the speech input received in the operation 410 and each candidate action of the plurality of candidate actions obtained in the operation 420 based on the current context information of the user.

The context means the situation information of the user of the moment that the user utters a command. That is, the context is information representing in what situation the user has uttered the corresponding command.

The current context information of the user means the situation information of the user of the moment that the user has uttered the speech input. For example, if the speech recognition apparatus 100 directly obtains the speech input through the microphone of the audio input interface 141, the current context information means the situation information of the user at the moment of having obtained the speech input. If the speech recognition apparatus 100 receives the speech input from an external electronic device through the transceiver 110, the current context information of the user may include the situation information of the user of the moment that the external electronic device has obtained the speech input.

The context information includes various types of information representing the user's situation. For example, the current context information of the user may include at least one of information on the time of the speech input uttered by the user, the place of the speech input uttered by the user, whether the user is moving, the moving speed of the user, or the device being used by the user.

The speech recognition apparatus 100 may collect the current context information of the user through the sensor 130 and/or receive the current context information of the user from the electronic device possessed by the user through the transceiver 110.

The operation 430 may include operations 431 and 432.

In the operation 431, the speech recognition apparatus 100 decides the weight of each candidate action for each type of each context information by analyzing the accumulated context information with respect to the user.

The accumulated context information with respect to the user means information of having collected and stored the situation information of the user at the time point of having uttered the corresponding command if the user utters the command, for a predetermined duration. That is, the accumulated context information with respect to the user is a log that has collected the command uttered by the user for a predetermined duration together with the context information of the user at the time point of having uttered each command. That is, the accumulated context information is a command usage history for each accumulated situation of the user for a predetermined duration.

As described above, the context information may include various types of information representing the user's situation. For example, the accumulated context information with respect to the user may include at least one of information on the time of having received the command, the place of having received the command, the frequency performed by the action, whether the user was moving when the command was received, the moving speed of the user when the command is received, or the device used in receiving the command, for each action performed by the user's command.

Whenever providing the speech recognition service, the speech recognition apparatus 100 may generate and manage the accumulated context information by storing the command instructed by the user and the context information of the user at the time point of having received the corresponding command in the memory 150.

Optionally, the speech recognition apparatus 100 may transmit the command instructed by the user and the context information of the user at the time point of having received the corresponding command to the server 200 through the transceiver 110. The server 200 may generate and manage the accumulated context information by storing the received information in a cloud storage.

In the operation 431, the speech recognition apparatus 100 decides a weight of each candidate action for each type of the context information included in the accumulated context information with respect to the user. For example, the accumulated context information includes information of a first type, a second type, and a third type, and the speech recognition apparatus 100 may decide a weight for the first type, a weight for the second type, and a weight for the third type with respect to each candidate action. A specific process of deciding a weight of the operation 431 will be described later with reference to FIG. 5.

In the operation 432, the speech recognition apparatus 100 calculates the relevance between the speech input and each candidate action by combining the weights decided in the operation 431 for each candidate action. For example, the speech recognition apparatus 100 may decide a value of summing the weights decided in the operation 431 for each candidate action as the relevance between the speech input and each candidate action. The speech recognition apparatus 100 may provide a priority between the plurality of candidate actions based on the relevance.

In an example, the speech recognition apparatus 100 may update the relevance between the speech input and each candidate action by repeatedly perform the operation 430 for each predetermined time period. The speech recognition apparatus 100 may store the relevance decided for each predetermined time period in the memory 150.

In operation 440, the speech recognition apparatus 100 decides one final action among the plurality of candidate actions decided in the operation 420 based on the relevance decided in the operation 432. For example, the speech recognition apparatus 100 may decide a candidate action having the maximum relevance as the final action. For example, if the candidate action having the maximum relevance is in plural, the speech recognition apparatus 100 may decide the final action among the plurality of candidate actions having the maximum relevance according to a predetermined priority. For example, the speech recognition apparatus 100 may present one or more candidate actions to the user as an option for the final action based on the relevance. In this case, the speech recognition apparatus 100 may decide a candidate action selected by the user from one or more options as the final action by performing additional interaction with the user.

Subsequently, the speech recognition apparatus 100 may execute the final action decided in the operation 440, generate a response based on the execution result of the final action through the speaker and/or the display 121 of the audio output interface 142, and deliver it to the user as the response to the speech input received in the operation 410.

Figure 5:
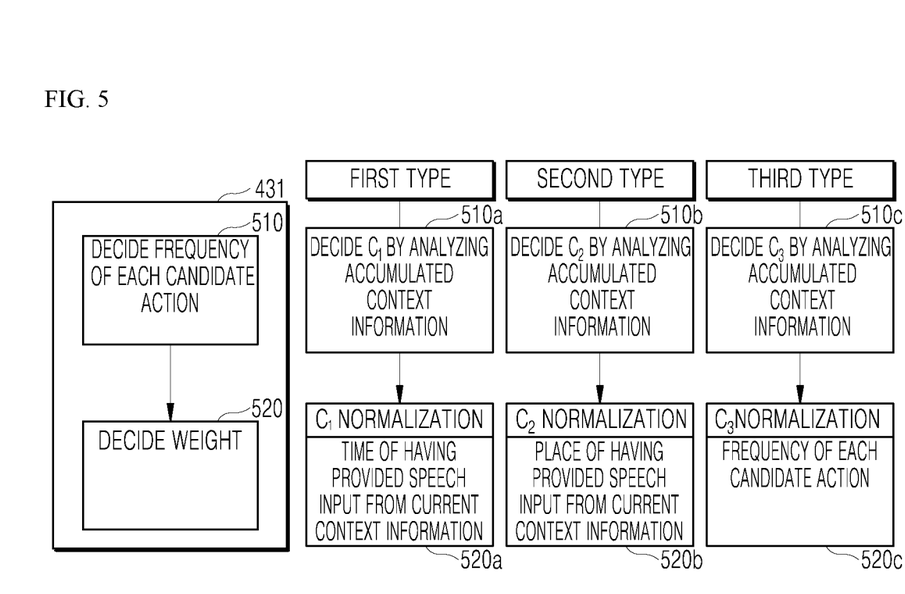
FIG. 5 is an exemplary flowchart of a process of deciding a weight of each candidate action according to an embodiment.

FIG. 5 is an exemplary flowchart of a process of deciding a weight of each candidate action according to an embodiment.

The deciding the weight of each candidate action (operation 431) with reference to FIG. 4 may include operations 510 and 520.

In operation 510, the speech recognition apparatus 100 may decide the frequency of having performed each candidate action by analyzing the accumulated context information with respect to the user. For example, the speech recognition apparatus 100 may decide the frequency of having performed each candidate action by analyzing the accumulated context information to count the number of times (C) of each candidate action performed by the user for the time defined for each type of the context information.

In operation 520, the speech recognition apparatus 100 may decide a weight of each candidate action with respect to each type of the context information based on the frequency decided in the operation 510. For example, the speech recognition apparatus 100 may normalize the frequency decided in the operation 510 according to a condition defined for each type of the context information, and decide a result value of the normalization corresponding to the current context information as the weight of each candidate action with respect to the given type of the context information.

Hereinafter, a process of deciding a weight of each candidate action for each type of the context information will be described in detail.

The first flowchart of FIG. 5 exemplarily shows a process of deciding a weight of each candidate action for the first type of the context information (the operation 431 in FIG. 4). The first type of the context information is time information of the speech input uttered by the user.

The operation 510 for the first type of the context information may include operation 510a. In the operation 510a, the speech recognition apparatus 100 decides the frequency of having performed each candidate action by counting the number of times ($C_1$) of each candidate action performed by the user for each predetermined time unit from the accumulated context information. For example, the speech recognition apparatus 100 may decide the number of times ($C_1$) of having performed each candidate action for each predetermined time unit as the frequency of having performed the candidate action.

The predetermined time unit may be one of one second, one minute, and one hour, for example. The predetermined time unit may be day and night, for example. In an example, the user may arbitrarily set a time unit within a range of one day. In an example, the predetermined time unit may be set according to a user's life pattern such as a work time or a commute time.

The operation 520 for the first type of the context information may include operation 520a. In the operation 520a, the speech recognition apparatus 100 normalizes the number of times ($C_1$) of having performed each candidate action counted in the operation 510a with respect to the entire time period, and decides a result value of the normalization corresponding to the time information that has uttered the speech input from the current context information of the user as a weight of each candidate action for the first type of the context information. For example, in the operation 520a, the speech recognition apparatus 100 may obtain a function $f_1(x)$ for each candidate action that normalizes the number of times ($C_1$) that has performed each candidate action with respect to the entire time period, and decide the $f_1(x=$time of having uttered the speech input), which is the result value of the normalization corresponding to the time information of the speech input uttered by the user, as the weight of the corresponding candidate action for the first type of the context information.

The entire time period may be, for example, one of one day, one week, one month, and one year. In an example, the user may set the time period of the normalization to a desired value as necessary.

The second flow chart of FIG. 5 exemplarily shows a process of deciding a weight of each candidate action for the second type of the context information (the operation 431 in FIG. 4). The second type of the context information is place information of the speech input uttered by the user.

The operation 510 for the second type of the context information may include operation 510b. In the operation 510b, the speech recognition apparatus 100 may decide the frequency of having performed each candidate action by counting the number of times ($C_2$) of each candidate action performed by the user in at least one place where the user stays for a predetermined time or more from the accumulated context information. For example, the speech recognition apparatus 100 may decide the number of times ($C_2$) of each candidate action performed by the user in the corresponding place as the frequency of each candidate action.

For example, the predetermined time may be minutes or an hour. In an example, the user may adjust the length of the predetermined time within a range of one day.

The operation 520 for the second type of the context information may include operation 520b. In the operation 520b, the speech recognition apparatus 100 may normalize the number of times ($C_2$) that has performed each candidate action with respect to all places recorded in the accumulated context information, and decide a result value of the normalization corresponding to the place of having uttered the speech input from the current context information as a weight of each candidate action for the second type of the context information. For example, in the operation 520b, the speech recognition apparatus 100 may obtain a function $f_2(x)$ for each candidate action, which has normalized the number of times ($C_2$) that has performed each candidate action with respect to all places recorded in the accumulated context information, and decide the $f_2$(x=place of having uttered the speech input), which is a result value of the normalization corresponding to the place information of the speech input uttered by the user as a weight of the corresponding candidate action for the second type of the context information.

The third flow chart of FIG. 5 exemplarily shows a process of deciding a weight of each candidate action for the third type of the context information (the operation 431 in FIG. 4). The third type of the context information is frequency information of the action performed by the user.

The operation 510 for the third type of the context information may include operation 510c. In the operation 510c, the speech recognition apparatus 100 may decide the frequency for each action performed by the user by counting the number of times ($C_3$) for each action performed by the user for a predetermined time period from the accumulated context information.

The predetermined time period may be one of one week, one month, and one year, for example. In an example, the user may set the time period to a desired value as necessary.

Figure 6:
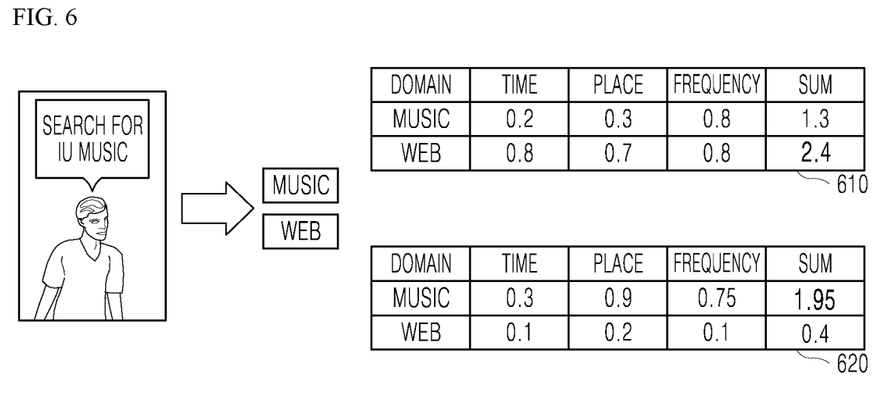
FIGS. 6 to 8 are diagrams for exemplarily explaining a process of deciding a final action according to an embodiment.
Figure 7:
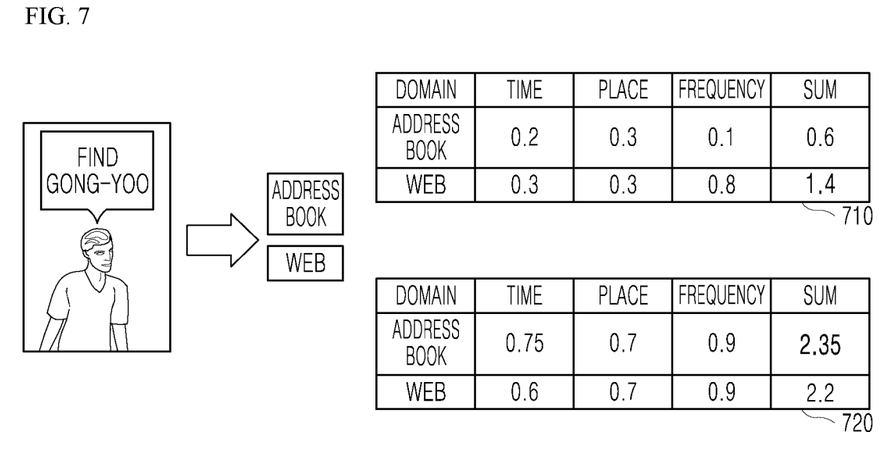
Figure 8:
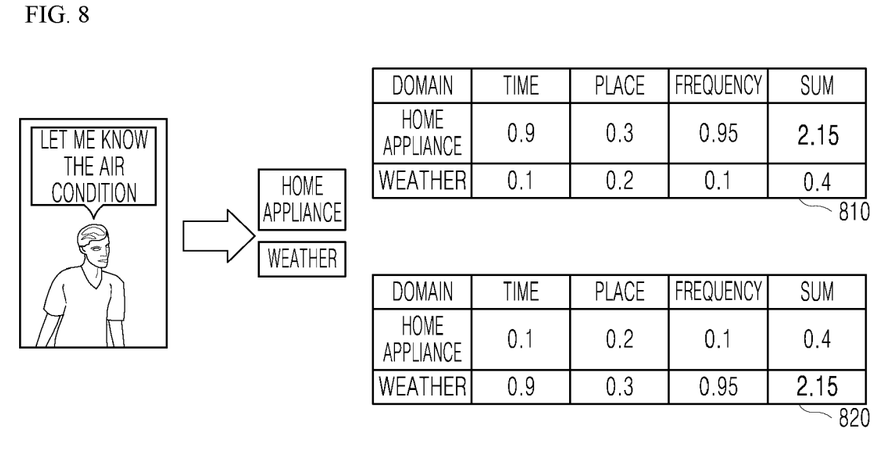

The operation 520 for the third type of the context information may include operation 520c. In the operation 520c, the speech recognition apparatus 100 may normalize the frequency for each action decided in the operation 510c, and decide the result value of the normalization corresponding to each candidate action as the weight of each candidate action for the third type of the context information. In an example, the frequency for each action may be equal to the number of times ($C_3$) that has performed each action for the predetermined time period. For example, the speech recognition apparatus 100 may decide the number of times ($C_3$) that has performed the action for the predetermined time period as the frequency of each candidate action. For example, in the operation 520c, the speech recognition apparatus 100 may obtain a function $f_3(x)$ that normalizes the frequency of each candidate action, and decide the $f_3$(x=candidate action $_i$), which is a result value of the normalization corresponding to each candidate action, as a weight of the corresponding candidate action for the third type of the context information. Here, the candidate action means an $i^{th}$ candidate action among a plurality of candidate actions, and if the plurality of candidate actions are N, the i is a natural number of 1 to N. FIGS. 6 to 8 are diagrams for exemplarily explaining a process of deciding a final action according to an embodiment. Hereinafter, a process of deciding a final action by the speech recognition apparatus 100 according to an embodiment in order to provide a speech recognition service will be described with reference to FIGS. 6 to 8.

FIG. 6 shows a first example of deciding a final action.

In FIG. 6, the speech recognition apparatus 100 receives the speech input of the user in the operation 410 with reference to FIG. 4. The speech input of the user in an example of the FIG. 6 is 'Search for IU music.'

In the operation 420, as a result of analyzing the 'Search for IU music' by using a natural language processing model in the speech recognition apparatus 100 or the server 200, a candidate action according to a combination of the named entity and the domain may be decided. For example, if the named entity is 'IU' and the domain is 'music,' the first candidate action may be decided as the 'Search for IU in a music app.' For example, if the named entity is 'IU music' and the domain is 'web,' the second candidate action may be decided as the 'Search for IU music in a search engine app.' In the operation 420, the speech recognition apparatus 100 obtains a plurality of candidate actions including a first candidate action and a second candidate action.

In FIG. 6, it is assumed that the exemplary user A and user B utter 'Search for IU music' in a company at 2 p.m., respectively. In this case, the current context information of the users includes that the time of having uttered the speech input is 2 p.m., and the place of having uttered the speech input is a company.

In the operation 430 with reference to FIG. 4, the speech recognition apparatus 100 decides the relevance between the speech input and each candidate action of the plurality of candidate actions based on the current context information of the user. To this end, the weight of each candidate action for each type of the context information decided by analyzing the accumulated context information is used.

Table 610 and Table 620 of FIG. 6 exemplarily show weight tables of the candidate action for the type of the context information used by the speech recognition apparatus 100 for deciding the relevance in the operation 430. Tables 610 and 620 are weight tables for each type of the context information of a first candidate action (music) and a second candidate action (web) of exemplary user A and user B.

In the operation 430 with reference to the exemplary weight table shown in Table 610, the speech recognition apparatus 100 may decide 1.3, which is the sum of the weights of the first candidate action (music), as the relevance between the speech input and the first candidate action (music). In addition, in the operation 430, the speech recognition apparatus 100 may decide 2.4, which is the sum of the weights of the second candidate action (web), as the relevance between the speech input and the second candidate action (web). In this case, in the operation 440, the speech recognition apparatus 100 decides the second candidate action (web) having a larger relevance as a final action for the user A.

In the operation 430 with reference to the exemplary weight table shown in Table 620, the speech recognition apparatus 100 may decide 1.95, which is the sum of the weights of the first candidate action (music), as the relevance between the speech input and the first candidate action (music). In addition, in the operation 430, the speech recognition apparatus 100 may decide 0.4, which is the sum of the weights of the second candidate action (web), as the relevance between the speech input and the second candidate action (web). In this case, in the operation 440, the speech recognition apparatus 100 decides the first candidate action (music) having a larger relevance as a final action for the user B.

FIG. 7 shows a second example of deciding a final action.

In FIG. 7, the speech recognition apparatus 100 receives the speech input of the user in the operation 410 with reference to FIG. 4. In an example of FIG. 7, the speech input of the user is 'Find Gong-yoo.'

In the operation 420, as a result of analyzing the 'Find Gong-yoo' by using a natural language processing model in the speech recognition apparatus 100 or the server 200, a candidate action according to the combination of the named entity and the domain may be decided. For example, if the named entity is 'Gong-yoo' and the domain is 'address book,' a first candidate action may be decided as 'Search for Gong-yoo in an address book.' For example, if the named entity is 'Gong-yoo' and the domain is 'web,' a second candidate action may be decided as 'Search for Gong-yoo in a search engine app.' In the operation 420, the speech recognition apparatus 100 obtains a plurality of candidate actions including the first candidate action and the second candidate action.

In FIG. 7, it is assumed that exemplary user A and user B utter 'Search for Gong-yoo' near a company at 10 a.m., respectively. In this case, the current context information of the users includes that the time of having uttered the speech input is 10 a.m. and the place of having uttered the speech input is near a company.

In the operation 430 with reference to FIG. 4, the speech recognition apparatus 100 decides the relevance between the speech input and each candidate action of the plurality of candidate actions based on the current context information of the user. To this end, the weight of each candidate action for each type of the context information decided by analyzing the accumulated context information is used.

Table 710 and Table 720 of FIG. 7 exemplarily show weight tables of the candidate action for the type of the context information used by the speech recognition apparatus 100 for deciding the relevance in the operation 430. Tables 710 and 720 are weight tables for each type of the context information of a first candidate action (address book) and a second candidate action (web) of exemplary user A and user B.

In the operation 430 with reference to the weight table of the user A in Table 710, the speech recognition apparatus 100 may decide 0.6, which is the sum of the weights of the first candidate action (address book), as the relevance between the speech input and the first candidate action (address book). In addition, in the operation 430, the speech recognition apparatus 100 may decide 1.4, which is the sum of the weights of the second candidate action (web), as the relevance between the speech input and the second candidate action (web). In this case, in the operation 440, the speech recognition apparatus 100 decides the second candidate action (web) having a larger relevance as a final action for the user A.

In the operation 430 with reference to the weight table of the user B in Table 720, the speech recognition apparatus 100 may decide 2.35, which is the sum of the weights of the first candidate action (address book), as the relevance between the speech input and the first candidate action (address book). In addition, in the operation 430, the speech recognition apparatus 100 may decide 2.2, which is the sum of the weights of the second candidate action (web), as the relevance between the speech input and the second candidate action (web). In this case, in the operation 440, the speech recognition apparatus 100 decides the first candidate action (address book) having a larger relevance as a final action for the user B.

FIG. 8 shows a third example of deciding a final action.

In FIG. 8, the speech recognition apparatus 100 receives the speech input of the user in the operation 410 with reference to FIG. 4. In an example of FIG. 7, the speech input of the user is 'Let me know the air condition.'

In the operation 420, as a result of analyzing the 'Let me know the air condition' by using a natural language processing model in the speech recognition apparatus 100 or the server 200, a candidate action according to the combination of the named entity and the domain may be decided. For example, if the named entity is 'air condition' and the domain is 'home appliance,' a first candidate action may be decided as 'the air cleaner has informed the indoor air condition.' For example, if the named entity is 'air condition' and the domain is 'weather,' a second candidate action may be decided as 'the weather app has informed the outdoor fine dust condition.' In the operation 420, the speech recognition apparatus 100 obtains a plurality of candidate actions including the first candidate action and the second candidate action.

In FIG. 8, it is assumed that exemplary user A and user B utter 'Let me know the air condition' at 11 p.m. at home, respectively. In this case, the current context information of the users includes that the time of having uttered the speech input is 11 p.m. and the place of having uttered the speech input is at home.

In the operation 430 with reference to FIG. 4, the speech recognition apparatus 100 decides the relevance between the speech input and each candidate action of the plurality of candidate actions based on the current context information of the user. To this end, the weight of each candidate action for each type of the context information decided by analyzing the accumulated context information is used.

Table 810 and Table 820 of FIG. 8 exemplarily show weight tables of the candidate action for the type of the context information used by the speech recognition apparatus 100 for deciding the relevance in the operation 430. Tables 810 and 820 are weight tables for each type of the context information of a first candidate action (home appliance) and a second candidate action (weather) of exemplary user A and user B.

In the operation 430 with reference to the weight table of the user A in Table 810, the speech recognition apparatus 100 may decide 2.15, which is the sum of the weights of the first candidate action (home appliance), as the relevance between the speech input and the first candidate action (home appliance). In addition, in the operation 430, the speech recognition apparatus 100 may decide 0.4, which is the sum of the weights of the second candidate action (weather), as the relevance between the speech input and the second candidate action (weather). In this case, in the operation 440, the speech recognition apparatus 100 decides the first candidate action (home appliance) having a larger relevance as a final action for the user A.

In the operation 430 with reference to the weight table of the user B in Table 820, the speech recognition apparatus 100 may decide 0.4, which is the sum of the weights of the first candidate action (home appliance), as the relevance between the speech input and the first candidate action (home appliance). In addition, in the operation 430, the speech recognition apparatus 100 may decide 2.15, which is the sum of the weights of the second candidate action (weather), as the relevance between the speech input and the second candidate action (weather). In this case, in the operation 440, the speech recognition apparatus 100 decides the second candidate action (weather) having a larger relevance as a final action for the user B.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Accordingly, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Accordingly, the scope of the present disclosure should be defined not by the above-described embodiments but by the technical idea defined in the following claims.

What is claimed is:

1. A method for providing a speech recognition service, comprising:
    receiving a speech input of a user;
    obtaining a plurality of candidate actions extracted from the speech input;
    deciding relevance between the speech input and each candidate action of the plurality of candidate actions based on current context information of the user; and
    deciding a final action of the plurality of candidate actions based on the relevance,
    wherein the deciding the relevance comprises:
    deciding a weight of each candidate action for each type of each context information by analyzing accumulated context information with respect to the user; and
    calculating the relevance by combining weights for each candidate action,
    wherein the deciding the weight comprises:
    deciding a frequency of having performed each candidate action by analyzing the accumulated context information with respect to the user; and
    deciding the weight of each candidate action with respect to each type of each context information based on the frequency.

2. The method of claim 1,
    wherein the obtaining the plurality of candidate actions comprises:
    transmitting the speech input to an external server; and
    receiving the plurality of candidate actions extracted by performing a natural language processing for a text representing the speech input by the external server.

3. The method of claim 1,
    wherein each candidate action of the plurality of candidate actions comprises a named entity that is a target of the action and domain information having classified a category of the action.

4. The method of claim 3,
    wherein each candidate action of the plurality of candidate actions are distinguished from each other by a combination of the named entity and the domain information.

5. The method of claim 1,
    wherein the current context information comprises at least one of information on a time of the speech input uttered by the user, a place of the speech input uttered by the user, whether the user is moving, a moving speed of the user, or a device being used by the user.

6. The method of claim 1,
    wherein the accumulated context information with respect to the user comprises at least one of information on a time received by a command, a place received by the command, a frequency performed by an action, whether the user was moving when the command was received, a moving speed of the user when the command is received, or a device used in receiving the command, for each action performed by the user's command.

7. The method of claim 1,
    wherein a first type of context information is time information of the speech input uttered by the user,
    wherein the deciding the frequency comprises deciding the frequency by counting a number of times of each candidate action performed by the user for each predetermined time unit, and
    wherein the deciding the weight of each candidate action with respect to each type of each context information based on the frequency comprises:

normalizing the number of times that has performed each candidate action with respect to an entire time period; and deciding a result value of the normalization corresponding to the time information of having uttered the speech input from the current context information as a weight for the first type of each candidate action.

8. The method of claim 1,
wherein a second type of context information is place information of the speech input uttered by the user,
wherein the deciding the frequency comprises deciding the frequency by counting a number of times of each candidate action performed by the user in at least one place where the user stays for a predetermined time or more, and
wherein the deciding the weight of each candidate action with respect to each type of each context information based on the frequency comprises:
normalizing the number of times that has performed each candidate action with respect to all places recorded in the accumulated context information; and
deciding a result value of the normalization corresponding to a place of having uttered the speech input from the current context information as a weight for the second type of each candidate action.

9. The method of claim 1,
wherein a third type of context information is frequency information of the action performed by the user,
wherein the deciding the frequency comprises deciding the frequency for each action performed by the user by counting a number of times performed for each action performed by the user for a predetermined time period, and
wherein the deciding the weight of each candidate action with respect to each type of each context information based on the frequency comprises:
normalizing the frequency for each action; and
deciding a result value of the normalization corresponding to each candidate action as a weight for the third type of each candidate action.

10. The method of claim 1,
wherein the deciding the relevance is repeatedly performed for each predetermined time period.

11. The method of claim 1,
wherein the deciding the final action comprises deciding a candidate action having a maximum relevance as the final action.

12. The method of claim 11,
wherein, when the candidate action having the maximum relevance is in plural, the deciding the final action comprises deciding the final action among the plurality of candidate actions having the maximum relevance according to a predetermined priority.

13. A speech recognition apparatus, comprising:
a microphone configured to receive a speech input of a user; and
a processor configured to decide one of a plurality of candidate actions extracted from the speech input as a final action,
wherein the processor is configured to perform:
an operation of deciding relevance between the speech input and each candidate action of the plurality of candidate actions based on current context information of the user, and
an operation of deciding the final action of the plurality of candidate actions based on the relevance,
wherein the operation of deciding the relevance comprises:
an operation of deciding a weight of each candidate action for each type of each context information by analyzing accumulated context information with respect to the user; and
an operation of calculating the relevance by combining weights for each candidate action, and
wherein the operation of deciding the weight comprises:
an operation of deciding a frequency of having performed each candidate action by analyzing the accumulated context information with respect to the user; and
an operation of deciding the weight of each candidate action with respect to each type of each context information based on the frequency.

14. The speech recognition apparatus of claim 13,
wherein each candidate action of the plurality of candidate actions are distinguished from each other by a combination of a named entity that is a target of the action and domain information having classified a category of the action.

15. The speech recognition apparatus of claim 13,
wherein the operation of calculating the relevance comprises an operation of summing the weights for each candidate action.

16. The speech recognition apparatus of claim 13,
wherein the current context information comprises at least one of information on a time of the speech input uttered by the user, a place of the speech input uttered by the user, whether the user is moving, a moving speed of the user, or a device being used by the user.

17. The speech recognition apparatus of claim 13,
wherein the accumulated context information with respect to the user comprises at least one of information on a time received by a command, a place received by the command, a frequency performed by an action, whether the user was moving when the command was received, a moving speed of the user when the command is received, or a device used in receiving the command, for each action performed by the user's command.

18. The speech recognition apparatus of claim 13,
wherein the operation of deciding the final action comprises an operation of deciding a candidate action having a maximum relevance as the final action.

19. The speech recognition apparatus of claim 18,
wherein, when the candidate action having the maximum relevance is in plural, the operation of deciding the final action comprises an operation of deciding the final action among the plurality of candidate actions having the maximum relevance according to a predetermined priority.

* * * * *